United States Patent
Kaczmarek et al.

(10) Patent No.: US 12,375,441 B1
(45) Date of Patent: *Jul. 29, 2025

(54) EXTERNALLY APPLYING INTERNAL NETWORK DOMAIN NAME SYSTEM (DNS) POLICIES

(71) Applicant: VERISIGN, INC., Reston, VA (US)

(72) Inventors: Michael Kaczmarek, Great Falls, VA (US); Eric Osterweil, Fairfax, VA (US)

(73) Assignee: VeriSign, Inc., Reston, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/473,317

(22) Filed: Sep. 13, 2021

Related U.S. Application Data

(63) Continuation of application No. 15/331,664, filed on Oct. 21, 2016, now Pat. No. 11,122,004.

(51) Int. Cl.
| | |
|---|---|
| *H04L 61/4511* | (2022.01) |
| *H04L 61/106* | (2022.01) |
| *H04L 61/2557* | (2022.01) |
| *H04L 61/2567* | (2022.01) |
| *H04L 101/668* | (2022.01) |

(52) U.S. Cl.
CPC ........ *H04L 61/4511* (2022.05); *H04L 61/106* (2013.01); *H04L 61/2557* (2013.01); *H04L 61/2567* (2013.01); *H04L 2101/668* (2022.05)

(58) Field of Classification Search
CPC ............... H04L 61/4511; H04L 61/106; H04L 61/2557; H04L 61/2567; H04L 2101/668
USPC ....................................................... 709/245
See application file for complete search history.

(56) References Cited

U.S. PATENT DOCUMENTS

| | | | | |
|---|---|---|---|---|
| 9,544,278 B2 * | 1/2017 | Hozza | ................ | H04L 63/0442 |
| 2005/0240990 A1* | 10/2005 | Trutner | ............... | H04L 63/0227 726/11 |
| 2010/0306409 A1* | 12/2010 | Jansen | ................ | H04L 61/4511 709/245 |
| 2014/0173134 A1* | 6/2014 | Choquette | ........... | H04L 61/4511 709/245 |
| 2015/0295882 A1* | 10/2015 | Kaliski, Jr. | ......... | H04L 61/4511 709/217 |
| 2016/0072847 A1* | 3/2016 | Bremen | ................ | G06F 21/305 726/1 |

* cited by examiner

*Primary Examiner* — Wing F Chan
*Assistant Examiner* — John Fan
(74) *Attorney, Agent, or Firm* — McCarter & English, LLP; Michael A. Sartori

(57) ABSTRACT

In one embodiment, a global domain name system (DNS) server processes a DNS query based on an internal network policy. Upon receiving a DNS query that is associated with a source IP address, the global DNS server identifies a client subnet based on the DNS query. The client subnet is associated with an internal device on an internal network. The global DNS server selects an internal network policy from multiple predetermined policies based on the source IP address and the client subnet. The global DNS server then tailors one or more DNS resolution operations that generate a response to the DNS query based on the selected internal network policy. Advantageously, the client subnet provides the global DNS server with visibility into the internal network. Such visibility enables the global DNS server to apply policies selectively at the granularity of individual devices on the internal network.

21 Claims, 3 Drawing Sheets

EXTERNALLY APPLYING INTERNAL NETWORK DOMAIN NAME SYSTEM (DNS) POLICIES

CROSS-REFERENCE TO RELATED APPLICATIONS

This application is a continuation of the co-pending U.S. patent application titled, "EXTERNALLY APPLYING INTERNAL NETWORK DOMAIN NAME SYSTEM (DNS) POLICIES," filed on Oct. 21, 2016, and having Ser. No. 15/331,664. The subject matter of this related application is hereby incorporated herein by reference.

BACKGROUND OF THE INVENTION

Field of the Invention

Embodiments of the present invention relate generally to computer networks and, more specifically, to externally applying internal network domain name system (DNS) policies.

Description of the Related Art

As is well known, the domain name service (DNS) is the part of the Internet infrastructure that translates human-readable domain names into the Internet Protocol (IP) addresses needed to establish TCP/IP (Transmission Control Protocol/Internet Protocol) communication over the Internet. In operation, DNS servers maintain large databases that store a variety of information associated with domain names. Any resource may transmit a DNS query that requests information stored in the DNS based on a domain name to a DNS server. As referred to herein, a "resource" may be any type of device or service.

Because different resources and/or DNS queries may be associated with a wide variety of preferences, requirements, security risks, and so forth, the behavior of a DNS server in response to different DNS queries is customizable via various types of polices. Many policies specify behavior of a DNS server based on the source IP address of the DNS query. As referred to herein, the "source IP address" of a given DNS query is the IP address of the resource that transmits the DNS query. For example, a policy could configure a DNS server to refuse to satisfy DNS queries received from source IP addresses that are considered potentially malicious. In another example, a policy could tailor the behavior of the DNS server based on both the source IP addresses and the domain names specified in the DNS queries to limit interactions between Internet resources.

One limitation of these types of policies is that differentiating DNS queries based on the source IP address may not provide satisfactory granularity in certain scenarios. For example, in a process referred to as "network address translation" (NAT), a company may map multiple different internal IP addresses to a single external NAT IP address. Such a mapping typically occurs at the border between an internal network and an external network, such as the Internet. In operation, when an internal device on the internal network initiates a DNS query, an internal server obfuscates the internal IP address of the DNS query with the external NAT IP address at the border. Consequently, DNS servers that reside beyond the border of the internal network are not able to apply any policies that differentiate between different internal devices based on the IP addresses included in the original DNS queries.

To enable tailored processing of DNS queries at the granularity of internal devices, an internal network that implements NAT would have to be configured with specialized software and/or hardware to circumvent the above problem. For example, software could be installed on each internal device that issues DNS queries to enable those internal devices to transmit DNS queries directly to external DNS servers. In another example, hardware that applies policies to DNS queries could be installed between each internal device that issues DNS queries and the internal server that transmits the DNS query to the external network. Such modifications not only complicate the topology of the internal network, but also can be unacceptably costly and time consuming to implement and maintain.

As the foregoing illustrates, what is needed in the art are more effective techniques for applying policies to DNS queries.

SUMMARY OF THE INVENTION

One embodiment of the present invention sets forth a method for applying internal network policies to domain name system (DNS) queries. The method includes receiving a DNS query that is associated with a source Internet Protocol (IP) address; identifying a client subnet based on the DNS query; selecting an internal network policy from a plurality of internal network policies based on the source IP address and the client subnet; and performing one or more DNS resolution operations based on the internal network policy to generate a response to the DNS query.

Further embodiments provide, among other things, a computer-readable medium and a system configured to implement the method set forth above.

One advantage of the disclosed techniques is that the client subnet enables external DNS servers that reside beyond the border of an internal network to apply internal network policies that differentiate between different internal devices. Notably, the client subnet provides such DNS servers visibility into internal networks that implement an external IP address that obfuscates internal IP addresses that identify internal devices. Consequently, an internal network that implements such an external IP address does not have to be reconfigured to enable external DNS servers to apply the internal network policies.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
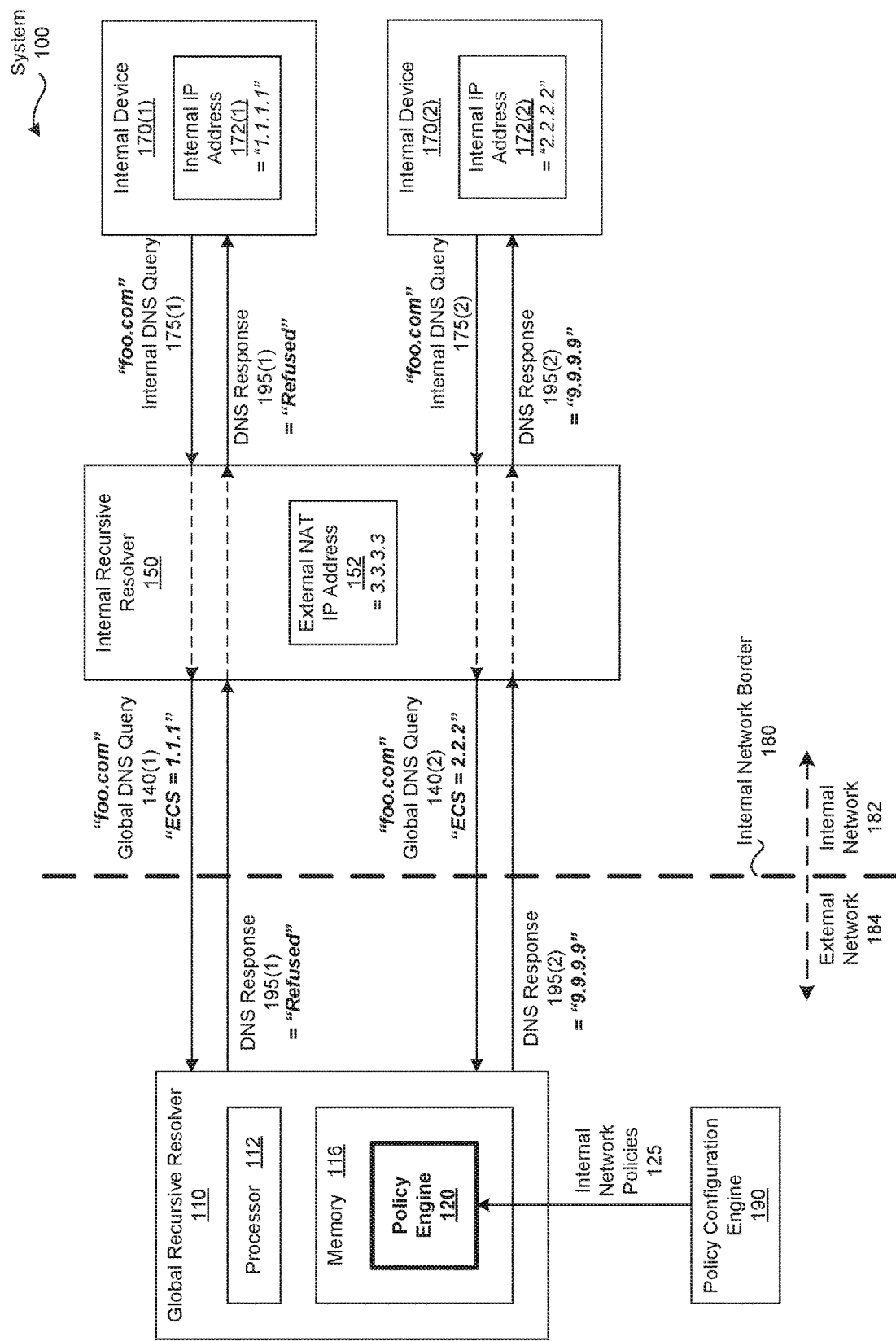
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, two internal devices 170, an internal recursive resolver 150, and a global recursive resolver 110. In alternate embodiments, the system 100 may include any number of internal devices 170, any number of internal recursive resolvers 150, and any number of global recursive resolvers 110 in any combination. For explanatory purposes, multiple instances of like objects are denoted with reference numbers identifying the object and parenthetical numbers identifying the instance where needed.

As a general matter, the system 100 includes, without limitation, entities and software that provide underlying technologies to support essential Internet functions, such as communications and security. In particular, the internal recursive resolver 150 and the global recursive resolver 110 provide a portion of a framework that implements the domain name system (DNS) protocol. For explanatory purposes, entities that provide the framework that implements the DNS protocol, including the internal recursive resolver 150 and the global recursive resolver 110, are referred to herein as "DNS servers." In alternate embodiments, the system 100 may include any number and types of other DNS servers in addition to the internal recursive resolver 150 and the global recursive resolver 110. For example, in various embodiments, the system 100 may include any number of authoritative name servers and/or forwarding resolvers.

The DNS is the part of the Internet infrastructure that translates human-readable domain names into the Internet Protocol (IP) numbers needed to establish TCP/IP (Transmission Control Protocol/Internet Protocol) communication over the Internet. The DNS is the mechanism that allows users to refer to web sites and other Internet resources via intuitive domain names, such as "example.com," rather than the actual numeric IP addresses, e.g., 192.0.2.78, that are associated with different websites and other Internet resources. Each domain name is typically made up of a series of character strings or "labels," where every two such character strings within the domain name are separated by a dot. The right-to-left order of the labels within a domain name correspond to the top-to-bottom order of domain names in a DNS hierarchy. The right-most label in a domain name is known as the top-level domain ("TLD"). Examples of well-known TLDs are "com"; "net"; "org"; and the like. Each TLD supports second-level domains, listed immediately to the left of the TLD, e.g., the "example" level in "example.com". Domains can nest within the hierarchy for many levels.

In general, the DNS enables users to associate a variety of information with domain names based on resource records. For example, in addition to storing address records that map domain names to IP addresses, the DNS stores service records (SRV) that identify services. Further, the DNS stores text records (TXT) that include arbitrary text and enable the DNS to serve as a general purpose database. A hierarchy of the DNS servers included in the system 100 maintain the resource records in large databases. In a process referred to herein as "DNS resolution," DNS servers traverse the DNS hierarchy to translate the domain names specified in various DNS queries into corresponding IP addresses associated with different Internet resources. As referred to herein, an "Internet resource" may be any type of device or service that is accessible via an external network 184.

As shown, the global recursive resolver 110 is included in the external network 184. By contrast, the internal devices 170 and the internal recursive resolver 150 are included in an internal network 182. The internal network 182 is a set of interconnected entities included within an internal network border 180. In alternate embodiments, the internal network 182 may be replaced with any network that includes the internal devices 170, and the external network 184 may be any network that includes the internal network 182 but does not directly include the internal devices 170. For example, in some embodiments, the internal network 182 is a local area network (LAN), and the external network 184 is a wide area network (WAN) that includes the internal network 182 and at least one additional LAN. In various embodiments, the external network 184 may be the Internet or a network that is implemented in a cloud (e.g., encapsulated shared resources, software, data, etc.).

Each of the internal devices 170 may be any device that is capable of requesting information stored in the DNS based on a domain name. As referred to herein, an internal DNS query 175 is any request for information stored in the DNS that is transmitted to a DNS server that is included in the internal network 182. By contrast, as referred to herein, a global DNS query 140 is any request for information stored in the DNS that is transmitted to a DNS server that is not included in the internal network 182. For explanatory purposes, requests for information stored in the DNS based on a domain name, including internal DNS queries 175 and global DNS queries 140, are referred to herein as "DNS queries."

To request information stored in the DNS based on a domain name, the internal device 170 generates the internal DNS query 175 and transmits the internal DNS query 175 to the internal recursive resolver 150. Upon receiving the internal DNS query 175, the internal recursive resolver 150 typically attempts to respond to the internal DNS query 175 based on information stored in a cache associated with the internal recursive resolver 150. If the cache associated with the internal recursive resolver 150 does not include the information requested in the internal DNS query 175, then the internal recursive resolver 150 generates and transmits the global DNS query 140 to the global recursive resolver 110. In this fashion, the internal device 170 instigates a chain of one or more DNS queries that request information stored in the DNS based on a domain name. For explanatory purposes, as referred to herein, each of the DNS chain, the internal DNS query 175, and the corresponding global DNS query 140 is instigated by the internal device 170.

Upon receiving the global DNS query 140, the global recursive resolver 110 typically attempts to respond to the global DNS query 140 based on information stored in a cache associated with the global recursive resolver 110. If the cache associated with the global recursive resolver 110 does not include the information requested in the global DNS query 140, then the global recursive resolver 110 may traverse the DNS hierarchy in an attempt to obtain the requested information. The global recursive resolver 110 may traverse the DNS hierarchy in any technically feasible fashion that is consistent with the DNS protocol. For example, the global recursive resolver 110 may begin traversing the DNS hierarchy at the root level.

As part of traversing the DNS hierarchy, the global recursive resolver 110 may generate and transmit any number of additional global DNS queries 140 to any number of authoritative name servers. In general, each of the authoritative name servers maintains an associated portion of the DNS hierarchy and is configured to answer the global DNS queries 140 based on information contained in the associated portion of the DNS hierarchy.

Because different resources and/or DNS queries may be associated with a wide variety of preferences, requirements, security risks, and so forth, the behavior of a DNS server in response to different DNS queries is often customizable via various types of polices. Policies may specify a wide range of behavior including, without limitation, traffic routing behavior, segregation behavior, redirection behavior, and forwarding behavior, to name a few. Many policies specify behavior of a DNS server based on the source IP address of the DNS query. As referred to herein, the "source IP address" of a given DNS query is the IP address of the resource that transmits the DNS query. For example, a policy could configure a DNS server to refuse to satisfy DNS queries received from source IP addresses that are considered potentially malicious. In another example, a policy could tailor the behavior of the DNS server based on both the source IP addresses and the domain names specified in the DNS queries to limit interactions between Internet resources.

One limitation these types of policies is that differentiating DNS queries based on the source IP address may not provide satisfactory granularity in certain scenarios. More specifically, although each of the internal devices 170 is associated with a different internal IP address 172, the internal network 182 is configured to implement "network address translation" (NAT) at the internal network border 180. As part of the NAT process, the internal recursive resolver 150 maps multiple different internal IP addresses 172 to a single external NAT IP address 152 that is associated with the internal recursive resolver 150.

In operation, as part of generating the global DNS query 140 corresponding to a given internal DNS query 175, the internal recursive resolver 150 obfuscates the internal IP address 172 associated with the internal DNS query 175 with the external NAT IP address 152. Accordingly, the source IP address of the global DNS query 140 is the external NAT IP address 152 irrespective of the source IP address of the internal DNS query 175. As a result, the global recursive router 110 is not able to ascertain which internal device 170 is the instigator of the global DNS query 140 based solely on the source IP address.

For example, the source IP address of the internal DNS query 175(1) is the internal IP address 172(1) "1.1.1.1" of the internal device 170(1). However, the source IP address of the global DNS query 140(1) that corresponds to the internal DNS query 175(1) is the external NAT IP address 152 "3.3.3.3." Further, the source IP address of the internal DNS query 175(2) is the internal IP address 172(2) "2.2.2.2" of the internal device 170(2). However, the source IP address of the global DNS query 140(2) that corresponds to the internal DNS query 175(2) is the external NAT IP address 152 "3.3.3.3." Notably, the source IP address of the global DNS query 140(1) and the source IP address of the global DNS query 140(2) are both equal to "3.3.3.3." Consequently, the global recursive resolver 110 is not able to properly apply policies that differentiate between the internal devices 170(1) and 170(2) to the global DNS queries 140(1) and 140(2). For explanatory purposes, a policy that differentiates between any number of the internal devices 170 is referred to herein as an "internal network policy" 125.

Examples of policies that are difficult, if not impossible, to enforce beyond the internal network border 180 based on conventional policy mechanisms include, without limitation:

Allowing internal devices 170 associated with a marketing organization to access social media sites, but prohibiting internal devices 170 associated with an engineering organization to access social media sites;

Restricting routing of DNS queries instigated by internal devices 170 associated with a high security level to Internet resources that are located in the continental US, while allowing unrestricted routing of other DNS requests; and Blocking DNS queries instigated by a subset of internal devices 170 while allowing DNS queries instigated by other internal devices 170.

Applying Internal Network Policies Globally

To enable the global recursive resolver 110 to properly apply the internal network policies 125 that differentiate between the internal devices 170 to the global DNS queries 140, the global recursive resolver 110 includes a policy engine 120. The policy engine 120 comprises a software program that generally resides within a memory 116 and is executed by a processor 112. The processor 112 may be any instruction execution system, apparatus, or device capable of executing instructions. For example, the processor 112 could comprise a central processing unit (CPU), a digital signal processor (DSP), a controller, a microcontroller, a state machine, or any combination thereof.

The memory 116 stores content, such as software applications and data, for use by the processor 112. The memory 116 may be any type of non-volatile memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

As shown, the global recursive resolver 110 includes, without limitation, the processor 112 and the memory 116. In alternate embodiments, the global recursive resolver 110 may include any number (including zero) and types of processors 112 and any number (including zero) and types of memories 116 in any combination. The processor 112 and the memory 116 may be implemented in any technically feasible fashion. For example, and without limitation, in various embodiments, the processor 112 and/or the memory 116 may be implemented as a stand-alone chip or as part of a more comprehensive solution that is implemented as an application-specific integrated circuit (ASIC) or a system-on-a-chip (SoC). In some embodiments, the global recursive resolver 110 may interact with one or more clouds (e.g., encapsulated shared resources, software, data, etc.) to perform operations implemented in the policy engine 120. In such embodiments, the processor 112 and/or the memory 116 may be implemented in the cloud instead of in the global recursive resolver 110.

The policy engine 120 leverages an Extension Mechanisms for DNS Version 0 (EDNSO) client subnet. The EDNSO client subnet is defined as part of an EDNSO OPT record (not shown in FIG. 1). The EDNSO client subnet is also referred to herein as the "client subnet." The EDNSO OPT record is a pseudo resource record that a downstream server attaches to a DNS query in compliance with DNS Extension protocols. Notably, the EDNSO OPT record provides information to upstream DNS servers but is not included in the DNS hierarchy that is maintained by the DNS servers. As referred to herein, a DNS server that receives a DNS query from a requester is "upstream" of the requester, and the requester is "downstream" of the DNS server. For example, the global recursive resolver 110 is upstream of the internal recursive resolver 150.

To enable the policy engine 120 to apply policies at the granularity of the internal devices 170, the system 100 implements client subnets derived from the internal IP addresses 172. During an initialization process, the internal recursive resolver 150 and the external recursive resolver 110 are both configured to implement client subnets. Further, a policy configuration engine 190 provides any number of internal network policies 125 that are based on both source IP addresses and the client subnets. The policy configuration engine 190 may provide the internal network policies 125 in any technically feasible fashion and in any format. For example, in some embodiments, the policy configuration engine 190 may include a graphical user interface (GUI) that enables a system administrator to define internal network policies 125. In general, each of the internal network policies 125 includes a rule that controls DNS resolution behavior for DNS queries that match one or more specified source IP addresses and one or more specified client subnets.

Upon receiving a given internal DNS query 175, the internal recursive resolver 150 generates a client subnet based on the internal IP address 172 of the internal DNS query 175 and an EDNSO OPT record that specifies the client subnet. The internal recursive resolver 150 may generate the client subnet and the EDNSO record in any technically feasible fashion that is consistent with the EDNSO protocol for client subnets. For instance, in some embodiments, the source IP address of the internal DNS query 175 may include four address octets, and the internal recursive resolver 150 may set the client subnet equal to the first three address octets of the source IP address of the internal DNS query 175. In other embodiments, the source IP address of the internal DNS query 175 may include 128 bits, and the internal recursive resolver 150 may set the client subnet equal to 16 of the bits included in the source IP address of the internal DNS query 175. The internal recursive resolver 150 then generates an EDNSO OPT record that includes the client subnet and an option code indicating that three address octets are included in the client subnet.

Subsequently, the internal recursive resolver 150 generates the global DNS query 140 corresponding to the internal DNS query 175. The internal recursive resolver attaches the EDNSO OPT record that specifies the client subnet to the global DNS query 140 and transmits the global DNS query 140 to the global recursive router 110. When the global recursive resolver 110 receives the global DNS query 140 and the attached EDNSO OPT record, the policy engine 120 applies the internal network policies 125. Notably, the policy engine 120 applies the internal network polices 125 based on both the source IP address of the global DNS query 140 (i.e., the external NAT IP address 152) and the attached client subnet (i.e., the internal IP address 172). As referred to herein, "applying" a given internal network policy 125 to the global DNS query 140 refers to the process of determining that the internal network policy 125 is applicable to the global DNS query 140 and then performing one or more DNS resolution operations based on the internal network policy 125.

In alternate embodiments, the internal recursive resolver 150 may specify the client subnet associated with the global DNS query 140 in any technically feasible fashion, and the global recursive resolver 110 may perform any number and type of operations based the global DNS query 140 to determine the client subnet. For example, in some embodiments, the internal recursive resolver 150 could include the client subnet as part of the query name (qname), and the global recursive resolver 110 could extract the client subnet from the qname. As referred to herein, the "query name" specifies a domain name that is the target of the global DNS query 140.

For explanatory purposes only, FIG. 1 depicts a scenario in which the internal network policy 125 is applicable to DNS queries that are associated with the source IP address "3.3.3.3" and the client subnet "1.1.1." The internal network policy 125 specifies that DNS queries that request information based on the domain name "foo.com" be refused. In the depicted scenario, two DNS query chains request an IP address associated with the domain name "foo.com." The internal device 170(1) that is associated with the internal IP address 172(1) "1.1.1.1" instigates the first DNS query chain. The internal device 170(2) that is associated with the internal IP address 172(12) "2.2.2.2" instigates the second DNS query chain.

As shown, to instigate the first DNS query chain, the internal device 170(1) transmits the internal DNS query 175(1) to the internal recursive resolver 150. The internal recursive resolver 150 then sets a client subnet to the first three address octets "1.1.1" of the source IP address of the internal DNS query 175(1) and generates an EDNSO record that specifies the client subnet. The internal recursive resolver 150 generates the global DNS query 140(1) that corresponds to the internal DNS query 170(1), attaches the EDNSO record to the global DNS query 140(1), and transmits the global DNS query 140(1) to the global recursive resolver 110.

When the global recursive resolver 110 receives the global DNS query 140(1), the policy engine 120 determines that the internal network policy 125 is applicable to the global DNS query 140(1) based on the source IP address "3.3.3.3" and the client subnet "1.1.1." Notably, the global DNS query 140(1) requests information based on the domain name "foo.com" and the internal network policy 125 specifies that information based on the domain name "foo.com" be refused. Consequently, the policy engine 120 configures the global recursive resolver 150 to refuse the DNS query 140(1). The global recursive resolver 110 generates the DNS response 195(1) that the requested information is refused. The global recursive resolver 110 then transmits the DNS response 195(1) to the internal recursive resolver 150. Finally, the internal recursive resolver 150 forwards the DNS response 195(1) to the internal device 170(1).

Subsequently, the internal device 170(2) transmits the internal DNS query 175(2) to the internal recursive resolver 150. The internal recursive resolver 150 sets a new client subnet to the first three address octets "2.2.2" of the source IP address of the internal DNS query 175(2) and generates a new EDNSO record that specifies the new client subnet. The internal recursive resolver 150 then generates the global DNS query 140(2) that corresponds to the internal DNS query 170(2), attaches the new EDNSO record to the global DNS query 140(2), and transmits the global DNS query 140(2) to the global recursive resolver 110.

When the global recursive resolver 110 receives the global DNS query 140(2), the policy engine 120 determines that the internal network policy 125 is not applicable to the global DNS query 140(1) based on the source IP address "3.3.3.3" and the client subnet "2.2.2." Consequently, the policy engine 120 does not modify the DNS resolution behavior of the global recursive resolver 150. The global recursive resolver 110 performs DNS resolution operations that map the domain name "foo.com" to the IP address "9.9.9.9." Subsequently, the global recursive resolver 110 generates the DNS response 195(2) that specifies the IP address "9.9.9.9" and transmits the DNS response 195(2) to the internal recursive resolver 150. Finally, the internal recursive resolver 150 forwards the DNS response 195(2) to the internal device 170(2).

As the different DNS responses 195(1) and 195(2) illustrate, the client subnet provides external visibility into the internal network 180. As a general matter, the policy engine 120 leverages this visibility to enable DNS servers that are outside the internal network 180 to apply the internal network policies 125 to internal devices 170. In various embodiments, the policy engine 120 is backwardly compatible. In such embodiments, if a DNS server that includes the policy engine 120 receives a DNS query that does not specify a client subnet, then the policy engine 120 does not apply the internal network policies 125 to the DNS query.

In alternate embodiments, any number and type of DNS servers may implement instance(s) of the policy engine 120 in any technically feasible fashion. Further, the policy engine 120 may be configured to apply any number of internal network policies 125 in conjunction with any number and type of other policies. For example, in some embodiments, the policy engine 120 may be configured to apply a set of global policies in addition to the internal network policies 125. As referred to herein, "global policies" are not defined based on the client subnet, but may be defined based on any other parameter, including the source IP address.

The descriptions of the various embodiments have been presented for purposes of illustration, but are not intended to be exhaustive or limited to the embodiments disclosed. Further, the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques described herein are applicable to facilitating "global" or "external" control of "internal" devices via internal network policies that specifies both a source IP address and a client subnet.

Figure 2:
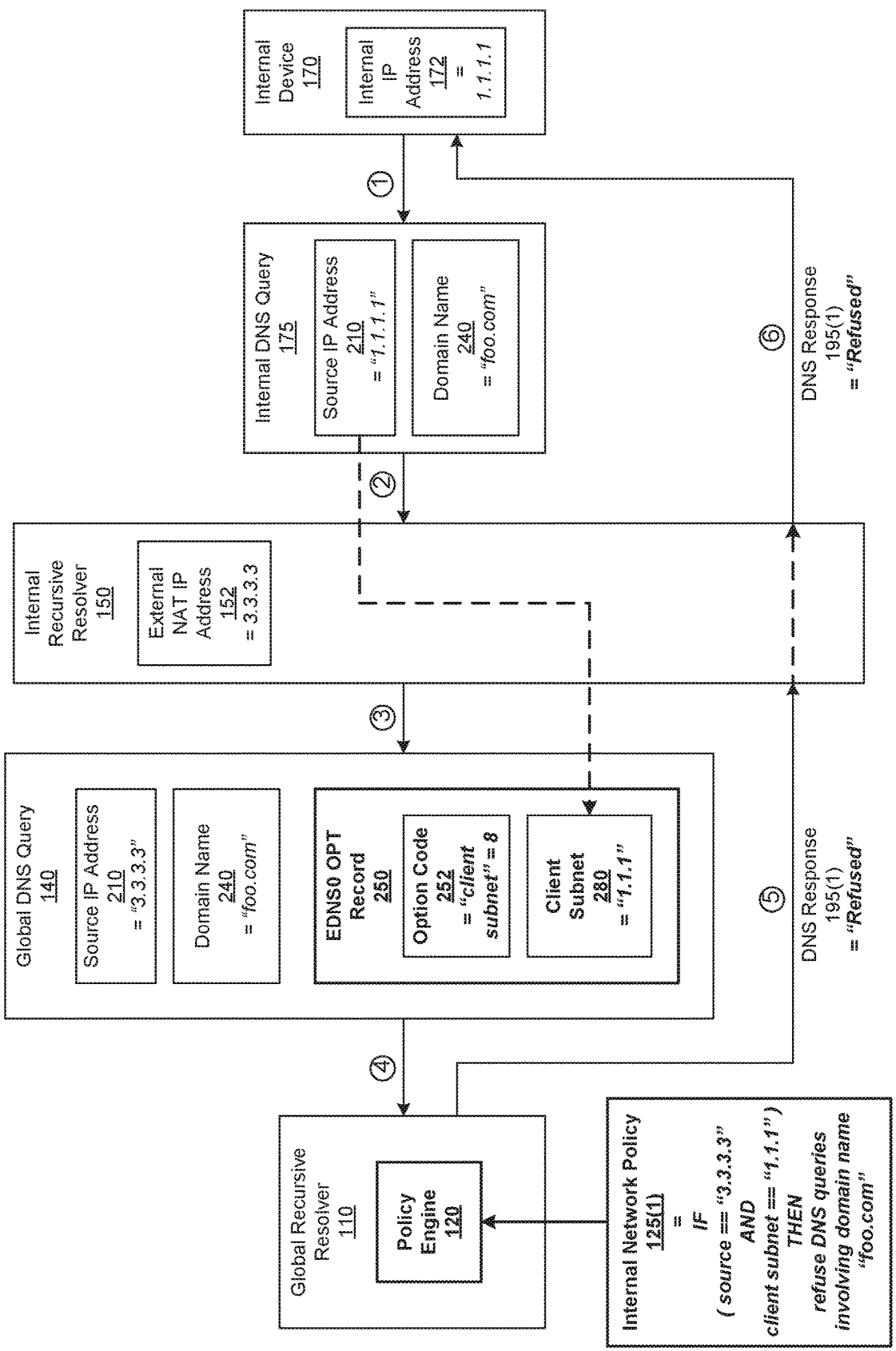
FIG. 2 illustrates how the global recursive resolver of FIG. 1 applies an internal network policy to a global DNS query, according to various embodiments of the present invention.

FIG. 2 illustrates how the global recursive resolver 110 of FIG. 1 applies the internal network policy 125(1) to the global DNS query 140, according to various embodiments of the present invention. As shown, the internal network policy 125(1) specifies that if a source IP address 210 is equal to "3.3.3.3" and a client subnet 280 is equal to "1.1.1," then DNS resolution behavior is to include refusing information when a domain name 240 is equal to "foo.com." For explanatory purposes only, a sequence of events involved in processing the internal DNS query 175 for an IP address associated with the domain name 240 "foo.com" is depicted with a series of numbered bubbles.

As depicted with the bubble numbered "1," the internal device 170 generates the internal DNS query 175 that requests the IP address associated with the domain name 240 "foo.com." As depicted with the bubble numbered 2, the internal device 170 transmits the internal DNS query 175 to the internal recursive resolver 150. Because the internal IP address 172 of the internal device 170 is "1.1.1.1," the source IP address 210 of the internal DNS query 175 is "1.1.1.1." Upon receiving the internal DNS query 175, the internal recursive resolver 150 determines that the cache associated with the internal recursive resolver 150 does not include an IP address associated with the domain name "foo.com."

Because the internal recursive resolver 150 is configured to implement the EDNS0 protocol, the internal recursive resolver 150 generates an EDNS0 OPT record 250. As shown, the EDNS0 OPT record 250 includes, without limitation, an option code 252 and a client subnet 280. In operation, the internal recursive resolver 150 sets the option code 252 to a predetermined value that indicates that the EDNS0 OPT record 250 specifies the client subnet 280. Further, the internal recursive resolver 150 sets the client subnet 280 to the first three address octets included in the source IP address 210 of the internal DNS query 175. In alternate embodiments, the internal recursive resolver 150 may compute the client subnet 280 in any technically feasible fashion that is consistent with both an EDNS0 protocol and the internal DNS query 175.

As depicted with the bubble numbered "3," the internal recursive resolver 150 generates the global DNS query 140 and then attaches the EDNS0 OPT record 250 to the global DNS query 140. More precisely, the internal recursive resolver 150 sets the domain name 240 included in the global DNS query 140 equal to domain name 240 included in the internal DNS query 175 (i.e., "foo.com"). Subsequently, as depicted with the bubble numbered "4," the internal recursive resolver 150 transmits the global DNS query 140 and the attached EDNS0 OPT record 250 to the global recursive router 110. Notably, because the external NAT IP address 152 of the internal recursive resolver 150 is "3.3.3.3," the source IP address 210 of the global DNS query 140 is "3.3.3.3."

After the global recursive resolver 110 receives the global DNS query 140, the policy engine 120 processes the global DNS query 140 based on the internal network policies 125. In general, the policy engine 120 determines which (if any) of the internal network policies 125 are applicable to the global DNS query 140 based on the source IP address 210 of the global DNS query 140 and the client subnet 280 specified in the EDNS0 OPT record 250. The internal network policies 125 that are applicable to the global DNS query 140 are referred to herein as the "applicable" internal network policies 125. The policy engine 120 may determine the applicable internal network policies 125 in any technically feasible fashion.

For example, in some embodiments, the policy engine 120 may perform one or more comparison operations to determine the applicable internal network policies 125. More specifically, the policy engine 120 may compare the source IP address 210 of the global DNS query 140 and the client subnet 280 specified in the EDNS0 OPT record 250 to the source IP addresses 210 and the client subnets 280 specified in the different internal network policies 125. In other embodiments, the internal network policies 125 may be organized into a policy database based on the source IP addresses 210 and the client subnets 280 specified in the internal network policies 125. In such embodiments, the policy engine 120 may perform one or more lookup operations on the policy database based on the source IP address 210 of the global DNS query 140 and the client subnet 280 specified in the EDNSO OPT record 250 to determine the applicable network policies 125.

In various embodiments, the internal network policies 125 may specify a range of source IP addresses 210 and/or client subnets 280 using any technically feasible techniques, such as wildcards. In such embodiments, the policy engine 120 may implement any number of complementary techniques to determine the applicable internal network policies 125. Further, in alternate embodiments, the policy engine 120 may evaluate any number of additional criteria to determine whether a given internal network policy 125 is applicable to the global DNS query 140. For example, in some embodiments, the policy engine may evaluate the domain name 280 included in the global DNS query 140 in addition to the source IP address 210 of the global DNS query 140 and the client subnet specified in the EDNSO OPT record 250.

After determining the applicable internal network policies 125, the policy engine 120 configures the global recursive router 110 to perform one or more DNS resolution operations based on the applicable internal network policy 125. Because the source IP address 210 of the global DNS query 140 is "3.3.3.3" and the client subnet specified in the attached EDNSO OPT record 250 is "1.1.1," the policy engine 120 determines that the internal network policy 125(1) is applicable to the global DNS query 140. The internal network policy 125(1) specifies that DNS resolution behavior is to include refusing information when the domain name 240 is equal to "foo.com." Consequently, the policy engine 120 configures the global recursive resolver 110 to generate the DNS response 195(1) "refused." As depicted with the bubble numbered "5," the global recursive resolver 110 transmits the DNS response 195(1) to the internal recursive resolver 150. Subsequently, as depicted with the bubble numbered "6," the internal recursive resolver 150 forwards the DNS response 195(1) to the internal device 170.

As a general matter, each of the internal network policies 125 may specify a wide range of behavior including, without limitation, traffic routing behavior, segregation behavior, redirection behavior, and forwarding behavior, to name a few. The policy engine 120 may tailor the behavior of the global recursive router 110 to comply with the applicable internal network policies 125 using any technically feasible techniques. For example, as illustrated in FIG. 2, suppose that a given internal network policy 125 prohibits access to information associated with one or more specified domain name 280. If the policy engine 120 identifies that the internal network policy 125 is applicable to a given DNS query, then the policy engine 120 configures the global recursive resolver 110 to determine whether to refuse the DNS query based on the domain name 280. For example, the policy engine 120 could configure the global recursive resolver 110 to generate the DNS response 195 that indicates that the DNS query is unsuccessful, blocks access to the requested information, redirects the DNS query to a predetermined error webpage, and/or provides a call that executes an action.

In other embodiments, the policy engine 120 may tailor the behavior of the global recursive router 110 to preferentially select an IP address to specify in the DNS response 195. For example, suppose that the global recursive router 110 determines that multiple IP addresses satisfy the global DNS query 140. The policy engine 120 could configure the global recursive resolver 140 to perform comparisons operations on any number of characteristics associated with the multiple IP addresses based on an applicable internal network policy 125. As a result of the comparison operations, the global recursive resolver 140 could select a preferred IP address and generate the DNS response 195 that includes the requested information based on the preferred IP address.

In yet other embodiments, the policy engine 120 may configure the global recursive router 110 to recursively traverse the DNS hierarchy based on a given applicable internal network policy 125. In such embodiments, the recursive router 110 attempts to translate the domain name 280 specified in the global DNS query 140 to an Internet protocol (IP) address that complies with the applicable internal network policy 125. As part of recursively traversing the DNS hierarchy, the global recursive router 110 may, without limitation, generate additional DNS queries, attach the EDNSO OPT record 250 to one or more of the additional DNS queries, and/or generate new EDNSO OPT records 250.

For example, in some embodiments, the policy engine 120 configures the global recursive router 110 to preferentially select an authoritative name server based on the internal network policy 125. The policy engine 120 also configures the global recursive resolver 110 to associate the client subnet 280 with a new DNS query and transmit the new DNS query to the selected authoritative name server. Upon receiving the DNS response 195 from the authoritative name server, the global recursive resolver 110 forwards the DNS response 195 to the internal recursive resolver 150.

Further, in some alternate embodiments, the policy engine 120 may apply any number of additional policies to the global DNS query 140. Such additional policies may include, without limitation, "global" policies that do not specify the client subnet. In various embodiments, the policy engine 120 may modify the behavior of the global recursive resolver 110 based on a combination of any number of applicable internal network policies 125 and/or any number of applicable global policies in any technically feasible fashion. In yet other embodiments, the policy engine 120 may collaborate with any number of other software applications to modify the behavior of the global recursive router 110 based, at least in part, on the applicable internal network policies 125.

Figure 3:
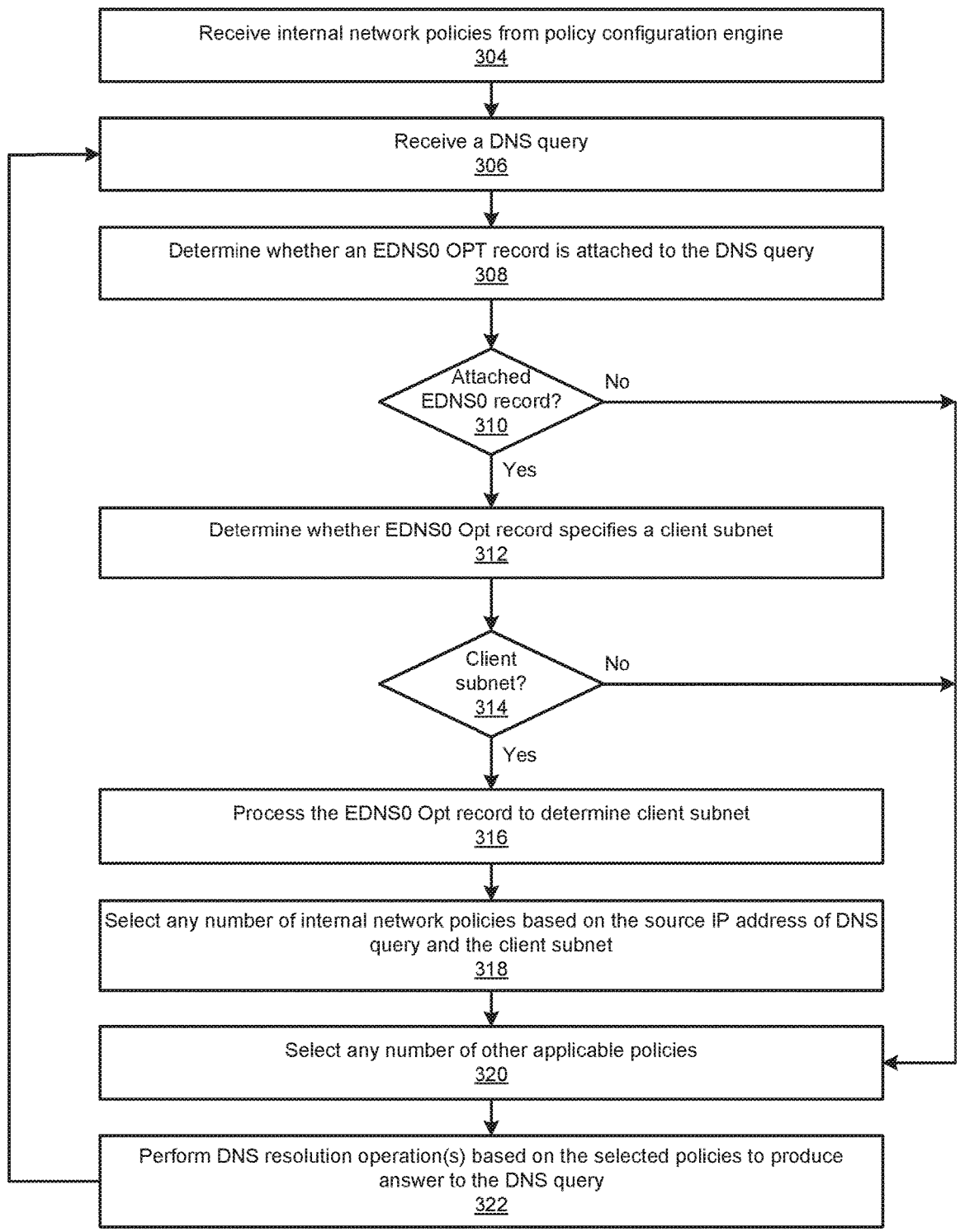
FIG. 3 is a flow diagram of method steps for applying internal network policies to global DNS queries, according to various embodiments of the present invention.

FIG. 3 is a flow diagram of method steps for applying internal network policies to global DNS queries, according to various embodiments of the present invention. Although the method steps are described with reference to the systems of FIGS. 1-2, persons skilled in the art will understand that any system configured to implement the method steps, in any order, falls within the scope of the present invention. In various embodiments, the method steps of FIG. 3 may be implemented by any DNS server that receives a DNS query from any network entity.

As shown, a method 300 begins at step 304, where the global recursive resolver 110 receives the internal network policies 125 from the policy configuration engine 190. In alternate embodiments, the global recursive resolver 110 may receive the internal network policies 125 in any technically feasible fashion. Each of the internal network policies 125 specifies DNS resolution behavior based on the source IP address 210 and the client subnet 280. At step 306, the global recursive resolver 110 receives the global DNS query 140 from the internal recursive resolver 150. Because the global DNS query 140 is received from the internal recursive resolver 150, the source IP address 210 of the global DNS query 140 is equal to the external NAT IP address 152 of the internal recursive resolver 150. In alternate embodiments, the global recursive resolver 110 may receive any DNS query from any entity instead of receiving the global DNS query 140 from the internal recursive resolver 150.

At step 308, the global recursive resolver 110 determines whether the EDNS0 OPT record 250 is attached to the global DNS query 140. If, at step 310, the global recursive resolver 110 determines that the EDNS0 OPT record 250 is not attached to the global DNS query 140, then the method 300 proceeds directly to step 320. If, however, at step 310, the global recursive resolver 110 determines that the EDNS0 OPT record 250 is attached to the global DNS query 140, then the method 300 proceeds to step 312.

At step 312, the global recursive resolver 110 determines whether the EDNS0 OPT record 250 specifies the client subnet 280. The global recursive resolver 110 may determine whether the EDNS0 OPT record 250 specifies the client subnet 280 in any technically feasible fashion. For example, the global recursive resolver 110 may perform a comparison operation on the option code 252 included in the EDNS0 OPT record 250 and a predetermined value that indicates that the EDNS0 OPT record 250 specifies the client subnet 280. If, at step 314, the global recursive resolver 110 determines that the EDNS0 OPT record 250 does not specify the client subnet 280, then the method 300 proceeds directly to step 320. If, however, at step 314, the global recursive resolver 110 determines that the EDNS0 OPT record 250 specifies the client subnet 280, then the method 300 proceeds to step 316.

At step 316, the global recursive resolver 110 processes the EDNS0 OPT record 250 to determine the client subnet 280. The global recursive resolver 110 may process the EDNS0 OPT record 250 in any manner that is consistent with the EDNS0 protocol. At step 318, the policy engine 120 included in the global recursive resolver 110 selects any number of the internal network policies 125 based on the source IP address 210 of the global DNS query 140 and the client subnet 280.

As a general matter, the policy engine 120 may perform any number and type of operations on the internal network policies 125 to select any number of the internal network policies 125 that are applicable to the global DNS query 140. For example, the policy engine 120 may compare the source IP address 210 of the global DNS query 140 and the client subnet 280 specified in the EDNS0 OPT record 250 to, respectively, the source IP address 210 and the client subnet 280 specified in each of the internal network policies 125.

At step 320, the policy engine 120 selects any number of other policies based on any number and type of parameters. For example, the policy engine 120 may select a global policy that is based on the source IP address 210. In alternate embodiments, the global recursive resolver 110 or a different application may select any number of policies in addition to the internal network policies 125 that the policy engine 120 selects. At step 322, the policy engine 120 configures the global recursive resolver 110 to perform any number of DNS resolution operations based on the selected policies to produce a response to the global DNS query 140.

The policy engine 120 may configure the global recursive resolver 110 to comply with the selected policies in any technically feasible fashion. For example, suppose that a selected internal network policy 125 specifies that information associated with the domain name 240 "foo.com" be refused. Further, suppose that the global DNS query 140 requests information based on the domain name 240 "foo.com." In such a scenario, the policy engine 120 could configure the global recursive resolver 110 to generate the DNS response 195 "refused."

The method 300 then returns to step 306, where the global recursive resolver 110 receives a new DNS query. The new DNS query may be received from any entity, including the internal recursive resolver 150. The global recursive resolver 110 continues to cycle through steps 306-322, processing and responding to DNS queries until the global recursive resolver 110 stops operating. As persons skilled in the art will recognize, the global recursive resolver 110 may process and respond to multiple DNS queries concurrently. Consequently, the global recursive resolver 110 may be executing different method steps on different DNS queries substantially in parallel. Further, in some embodiments, the global recursive resolver 110 may receive updated internal network policies 125 as the global recursive resolver 110 operates.

In sum, the disclosed techniques enable global recursive resolvers to apply internal network policies to DNS queries. An internal recursive resolver and a global recursive resolver are configured to implement Extension Mechanisms for DNS (EDNS) client subnet functionality for DNS queries. In addition, a policy engine included in a global recursive resolver is configured to implement one or more predetermined internal network policies. In operation, upon receiving an internal DNS query from an internal device, the internal recursive resolver generates a client subnet that is based on the IP address of the internal device. The internal recursive resolver then generates a global DNS query based on the internal DNS query and associates the client subnet with the global DNS query.

Upon receiving the global DNS query from the internal recursive resolver, the global recursive resolver determines that the global DNS query is associated with the client subnet. The global recursive resolver selects one or more of the internal network policies based on the combination of the IP address of the internal recursive resolver and the client subnet. The global recursive resolver then performs one or more DNS resolution operations on the global DNS query based on the selected internal network policies to produce an answer to the global DNS query that complies with the selected internal network policies.

Advantageously, the techniques described herein enable global recursive resolvers to customize responses to DNS queries at the granularity of internal devices irrespective of the topology of the internal network. In particular, the client subnet provides the global recursive resolver visibility into internal networks that implement an external NAT IP address that obfuscates the internal IP addresses. Further, configuring the global recursive resolver to apply internal network policies does not require modifying internal networks. By contrast, conventional approaches that enable global recursive resolvers to apply policies at the granularity of internal devices on internal networks that implement NAT require modifying the software and/or hardware included in the internal networks. Such modifications not only complicate the topology of the internal network, but also can be unacceptably costly and time consuming to implement and maintain.

1. In some embodiments, a method for applying internal network policies to domain name service (DNS) queries comprises receiving a DNS query that is associated with a source Internet Protocol (IP) address; identifying a client subnet based on the DNS query; selecting an internal network policy from a plurality of internal network policies based on the source IP address and the client subnet; and performing one or more DNS resolution operations based on the internal network policy to generate a response to the DNS query.

2. The method of clause 1, wherein the source IP address comprises an external network address translation (NAT) IP address that represents a plurality of internal devices included in an internal network, and the client subnet is based on an internal IP address that represents a first internal device included in the plurality of internal devices.

3. The method of clauses 1 or 2, wherein the internal IP address comprises four address octets, and the client subnet comprises one or more of the four address octets.

4. The method of any of clauses 1-3, wherein the internal IP address comprises 128 bits, and the client subnet comprises 16 or more of the 128 bits.

5. The method of any of clauses 1-4, wherein identifying the client subnet comprises determining that an Extension Mechanisms for DNS (EDNS) pseudo resource record specifying an EDNS client subnet option code and the client subnet is attached to the DNS query.

6. The method of any of clauses 1-5, wherein identifying the client subnet comprises determining that a query name associated with the DNS query includes the client subnet, and extracting the client subnet from the query name.

7. The method of any of clauses 1-6, wherein the internal network policy specifies at least one of translation behavior, traffic routing behavior, and forwarding behavior.

8. The method of any of clauses 1-7, wherein selecting the internal network policy from the plurality of internal network policies comprises performing one or more comparison operations between the internal network policy and the source IP address to determine that the internal network policy is applicable to the source IP address; and performing one or more comparison operations between the internal network policy and the client subnet to determine that the internal network policy is applicable to the client subnet.

9. The method of any of clauses 1-8, wherein performing one or more DNS resolution operations comprises determining that the internal network policy affects access to information associated with a domain name specified in the DNS query; and producing the response that conforms to the internal network policy.

10. The method of any of clauses 1-9, wherein the response is associated with at least one of indicating that the DNS query is unsuccessful, blocking access to the information, redirecting the DNS query to a predetermined error webpage, and providing a call that executes an action.

11. The method of any of clauses 1-10, wherein performing one or more DNS resolution operations comprises recursively traversing the DNS hierarchy to translate a domain name specified in the DNS query to a first IP address that complies with the internal network policy.

12. In some embodiments, a computer-readable storage medium includes instructions that, when executed by a processor cause the processor to apply internal network policies to domain name service (DNS) queries by performing the steps of receiving a DNS query that is associated with a source Internet Protocol (IP) address; identifying a client subnet based on the DNS query; selecting an internal network policy from a plurality of internal network policies based on the source IP address and the client subnet; and performing one or more DNS resolution operations based on the internal network policy to generate a response to the DNS query.

13. The computer-readable storage medium of clause 12, wherein the source IP address comprises an external network address translation (NAT) IP address that represents a plurality of internal devices included in an internal network, and the client subnet is based on an internal IP address that represents a first internal device included in the plurality of internal devices.

14. The computer-readable storage medium of clause 12 or 13, wherein the internal IP address comprises four address octets, and the client subnet comprises one or more of the four address octets.

15. The computer-readable storage medium of any of clauses 12-14, wherein identifying the client subnet comprises determining that an Extension Mechanisms for DNS (EDNS) pseudo resource record specifying an EDNS client subnet option code and the client subnet is attached to the DNS query.

16. The computer-readable storage medium of any of clauses 12-15, wherein the internal network policy specifies at least one of translation behavior, traffic routing behavior, and forwarding behavior.

17. The computer-readable storage medium of any of clauses 12-16, wherein selecting the internal network policy from the plurality of internal network policies comprises performing one or more comparison operations between the internal network policy and the source IP address to determine that the internal network policy is applicable to the source IP address; and performing one or more comparison operations between the internal network policy and the client subnet to determine that the internal network policy is applicable to the client subnet.

18. The computer-readable storage medium of any of clauses 12-17, wherein performing one or more DNS resolution operations comprises selecting a first authoritative name server based on the internal network policy; associating the client subnet with a new DNS query that is based on the DNS query; transmitting the new DNS query to the first authoritative name server; receiving a response to the new DNS query from the first authoritative name server; and forwarding the response to the internal server.

19. The computer-readable storage medium of any of clauses 12-18, wherein performing one or more DNS resolution operations comprises determining that both a first IP address and a second IP address satisfy the DNS query; comparing one or more characteristics associated with the first IP address to one or more characteristics associated with the second IP address based on the internal network policy to select a preferred IP address; and producing the response that specifies the preferred IP address.

20. In some embodiments, a system comprises a memory storing a policy engine; and a processor that is coupled to the memory and, when executing the policy engine, is configured to receive a DNS query that is associated with a source Internet Protocol (IP) address; identify a client subnet based on the DNS query; select an internal network policy from a plurality of internal network policies based on the source IP address and the client subnet; and perform one or more DNS resolution operations based on the internal network policy to generate a response to the DNS query.

21. The system of clause 20, wherein the source IP address comprises an external network address translation (NAT) IP address that represents a plurality of internal devices included in an internal network, and the client subnet is based on an internal IP address that represents a first internal device included in the plurality of internal devices.

22. The system of clause 20 or 21, wherein the internal network policy specifies at least one of translation behavior, traffic routing behavior, and forwarding behavior.

23. The system method of any of clauses 20-22, wherein the policy engine further configures the processor to transmit the response across a border between an external network and an internal network.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, the method comprising:
    receiving, by a recursive resolver, a domain name service (DNS) query, the DNS query including;
        a source Internet Protocol (IP) address representing a device that transmitted the DNS query, and
        a client subnet representing an internal network, wherein an IP address of the client subnet is different than the source IP address;
    selecting, by the recursive resolver and based on the source IP address and the client subnet, a policy to apply when performing one or more DNS resolution operations to generate a response to the DNS query; and
    applying the policy when performing the one or more DNS resolution operations to generate the response to the DNS query, wherein performing the one or more DNS resolution operations comprises traversing a DNS hierarchy to produce a response to the DNS query that complies with the policy.

2. The computer-implemented method of claim 1, wherein traversing the DNS hierarchy comprises translating a domain name specified in the DNS query to an IP address that complies with the policy.

3. The computer-implemented method of claim 1, wherein traversing the DNS hierarchy comprises generating a refusal to specify information associated with a domain name specified in the DNS query.

4. The computer-implemented method of claim 1, wherein traversing the DNS hierarchy comprises generating one or more additional DNS queries.

5. The computer-implemented method of claim 1, wherein traversing the DNS hierarchy comprises generating an additional DNS query, the additional DNS query including the client subnet.

6. The computer implemented method of claim 1, wherein:
    traversing the DNS hierarchy comprises generating an additional DNS query, the additional DNS query including an Extension Mechanisms for DNS (EDNS) record that indicates the client subnet, wherein the EDNS record is extracted from the DNS query.

7. The computer implemented method of claim 1, wherein:
    traversing the DNS hierarchy comprises generating an additional DNS query, the additional DNS query including an Extension Mechanisms for DNS (EDNS) record that indicates the client subnet, wherein the EDNS record is generated by the recursive resolver.

8. The computer-implemented method of claim 7, wherein traversing the DNS hierarchy comprises generating a refusal to specify information associated with a domain name specified in the additional DNS query.

9. The computer implemented method of claim 1, wherein traversing the DNS hierarchy comprises selecting an authoritative name server based on the policy.

10. The computer implemented method of claim 9, wherein traversing the DNS hierarchy further comprises transmitting a new DNS query to the selected authoritative name server, wherein the new DNS query is associated with the client subnet.

11. The computer implemented method of claim 10, wherein traversing the DNS hierarchy further comprises:
    receiving a DNS response from the selected authoritative name server; and
    forwarding the DNS response from the recursive resolver to a second recursive resolver.

12. The computer implemented method of claim 1, wherein the response to the DNS query comprises at least one of: a mapping of a domain names to an IP address, a service record, or a text record.

13. One or more non-transitory computer-readable storage media including instructions that, when executed by one or more processors, cause the one or more processors to perform steps of:
    receiving, by a recursive resolver, a domain name service (DNS) query, the DNS query including:
        a source Internet Protocol (IP) address representing a device that transmitted the DNS query, and
        a client subnet representing an internal network, wherein an IP address of the client subnet is different than the source IP address;
    selecting, by the recursive resolver and based on the source IP address and the client subnet, a policy to apply when performing one or more DNS resolution operations to generate a response to the DNS query; and
    applying the policy when performing the one or more DNS resolution operations to generate the response to the DNS query, wherein performing the one or more DNS resolution operations comprises traversing a DNS hierarchy to produce a response to the DNS query that complies with the policy.

14. The one or more non-transitory computer-readable storage media of claim 13, wherein traversing the DNS hierarchy comprises translating a domain name specified in the DNS query to an IP address that complies with the policy.

15. The one or more non-transitory computer-readable storage media of claim 13, wherein traversing the DNS hierarchy comprises generating one or more additional DNS queries.

16. The one or more non-transitory computer-readable storage media of claim 13, wherein traversing the DNS hierarchy comprises generating an additional DNS query, the additional DNS query including the client subnet.

17. The one or more non-transitory computer-readable storage media of claim 13, wherein:
    traversing the DNS hierarchy comprises generating an additional DNS query, the additional DNS query including an Extension Mechanisms for DNS (EDNS) record that indicates the client subnet, wherein the EDNS record is extracted from the DNS query.

18. A system comprising:
    a memory contained in a recursive resolver storing a policy engine; and
    a processor contained in the recursive resolver that is coupled to the memory and, when executing the policy engine, is configured to perform a method comprising:
        receiving, by a recursive resolver, a domain name service (DNS) query, the DNS query including:
            a source Internet Protocol (IP) address representing a device that transmitted the DNS query, and
            a client subnet representing an internal network, wherein an IP address of the client subnet is different than the source IP address;
        selecting, by the recursive resolver and based on the source IP address and the client subnet, a policy to apply when performing one or more DNS resolution operations to generate a response to the DNS query; and
        applying the policy when performing the one or more DNS resolution operations to generate the response to the DNS query, wherein performing the one or more DNS resolution operations comprises traversing a DNS hierarchy to produce a response to the DNS query that complies with the policy.

19. The system of claim 18, wherein traversing the DNS hierarchy comprises translating a domain name specified in the DNS query to an IP address that complies with the policy.

20. The system of claim 18, wherein traversing the DNS hierarchy comprises generating one or more additional DNS queries.

21. The system of claim 18, wherein traversing the DNS hierarchy comprises generating an additional DNS query, the additional DNS query including the client subnet.

* * * * *